June 26, 1962  E. M. CAFERRO ET AL  3,041,595
DISPLAY SIGN FOR ALTERNATELY DISPLAYING
TIME, TEMPERATURE AND DATE
Filed July 22, 1958  6 Sheets-Sheet 1

INVENTORS
Edward M. Caferro
Robert L. Howell
William H. Justus
Charles M. Williams
BY
Atty.

June 26, 1962  E. M. CAFERRO ET AL  3,041,595
DISPLAY SIGN FOR ALTERNATELY DISPLAYING
TIME, TEMPERATURE AND DATE
Filed July 22, 1958  6 Sheets-Sheet 2
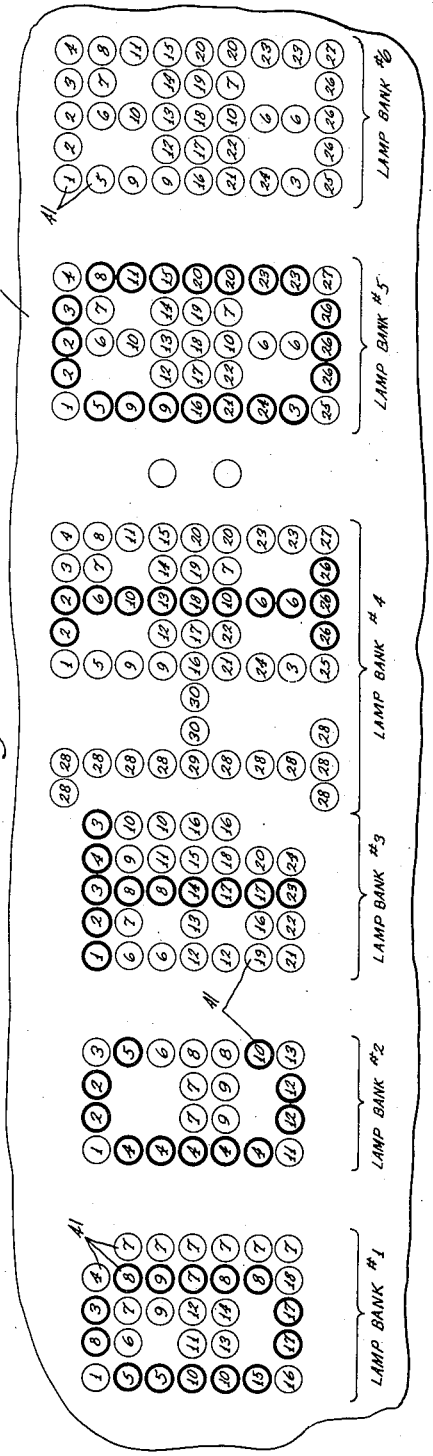
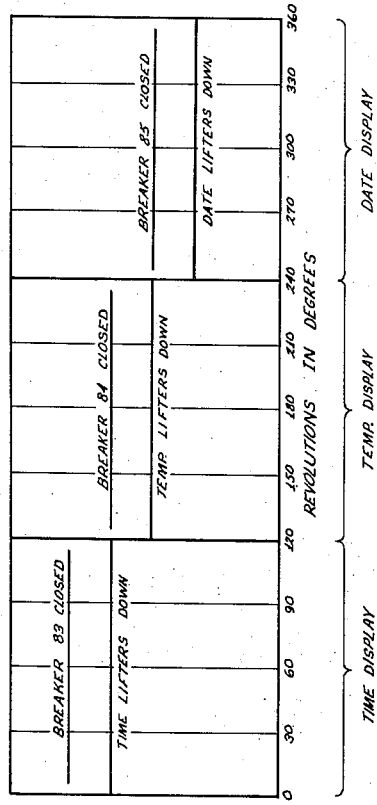
INVENTORS
Edward M. Caferro
Robert L. Howell
William H. Justus
Charles M. Williams
BY
Atty.

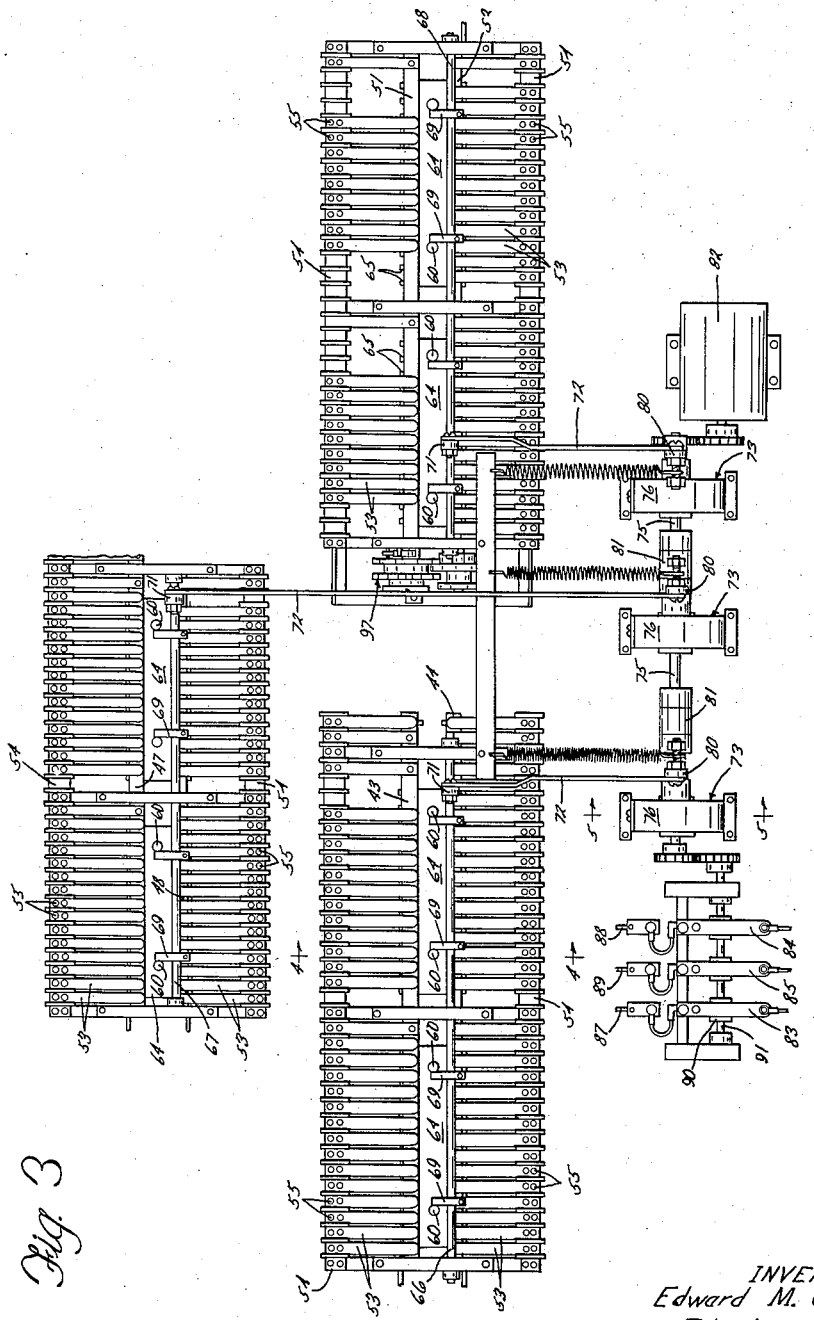

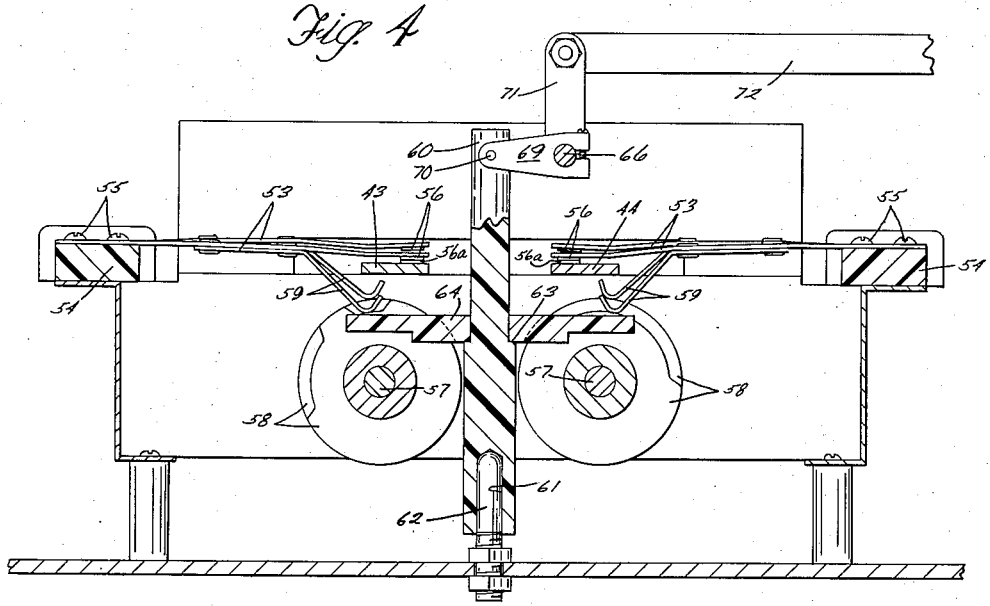
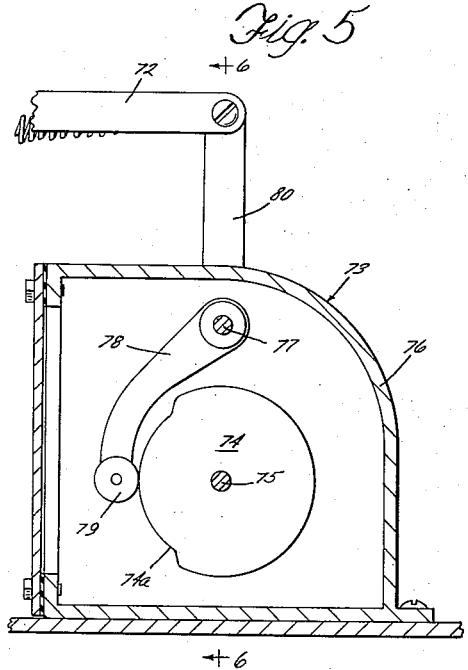
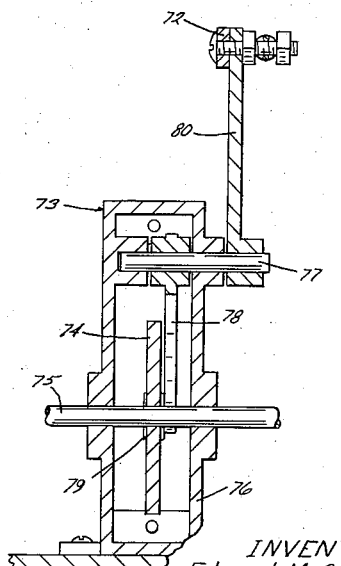
INVENTORS.
Edward M. Caferro
Robert L. Howell
William H. Justus
Charles M. Williams INVENTORS
Edward M. Caferro
Robert L. Howell
William H. Justus
Charles M. Williams
BY
Atty.

June 26, 1962  E. M. CAFERRO ET AL  3,041,595
DISPLAY SIGN FOR ALTERNATELY DISPLAYING
TIME, TEMPERATURE AND DATE
Filed July 22, 1958  6 Sheets-Sheet 6
Fig. 9
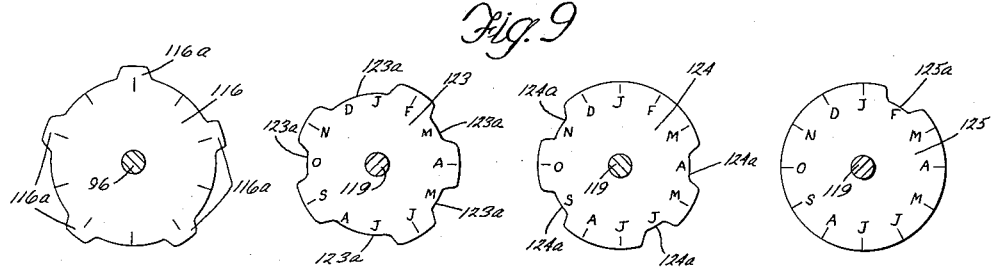
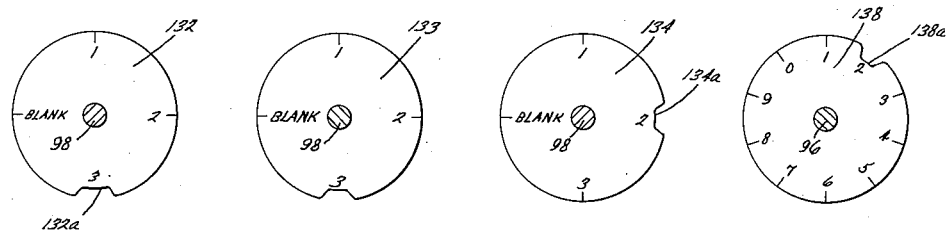
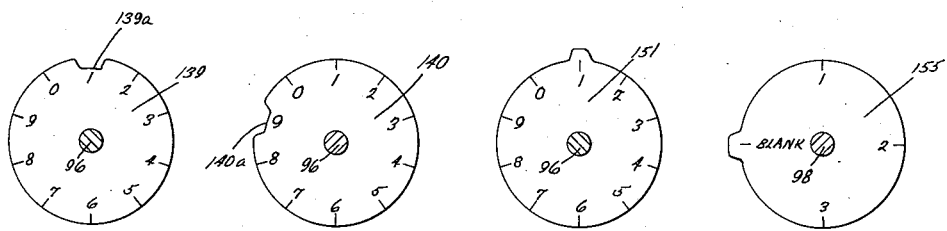
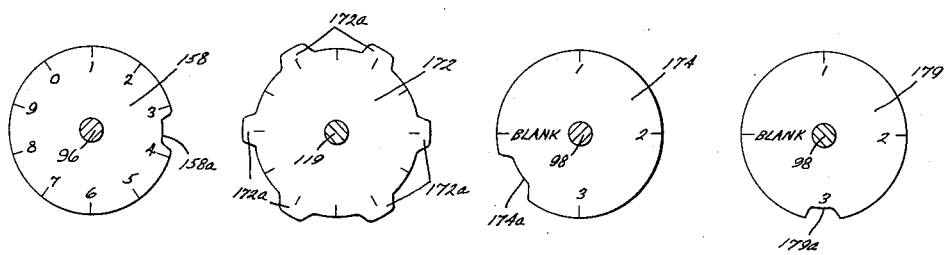
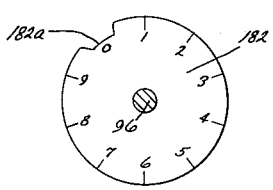
INVENTORS
Edward M. Caferro
Robert L. Howell
William H. Justus
Charles M. Williams
BY
Struhl Wells
Atty.

United States Patent Office 3,041,595
Patented June 26, 1962

3,041,595
DISPLAY SIGN FOR ALTERNATELY DISPLAYING
TIME, TEMPERATURE AND DATE
Edward M. Caferro, Robert L. Howell, William H. Justus, and Charles M. Williams, all of Spokane, Wash., assignors to American Sign & Indicator Corporation, Spokane, Wash., a corporation of Washington
Filed July 22, 1958, Ser. No. 750,230
5 Claims. (Cl. 340—324)

The present invention relates to improvements in display signs, and more particularly to improvements in display signs wherein combinations of lighted and darkened lamps are utilized to spell out successive displays of information.

The principal purpose of the present invention is to provide a device of the character described having one or more display panels and having three separate information indicating mechanisms, each operable to control the display panel or panels to display information thereon, together with means for rendering the information indicating mechanisms effective to control the display panel singly in repeating sequence to cause successive displays of the several kinds of information upon the panel or panels.

More specifically, it is the purpose of this invention to provide a display sign including at least one display panel having a plurality of lamps thereon connected in separate circuits, a time indicating mechanism including a first group of cam operated control switches operable to selectively light the lamps on the panel to display correct time, a temperature indicating mechanism including a second group of cam operated control switches operable to selectively light the lamps to display present temperature, and a date indicating mechanism including a third group of cam operated control switches operable to selectively light said lamps to spell out the current month and day, together with means to render the groups of control switches effective to control the lamps singly in repeating succession to provide for successive displays of the three kinds of information on the display panel.

A further purpose of the invention is to provide in a device of the character described, a novel date indicating mechanism and circuit which is operable in response to passage of time to manipulate a group of lamp control switches to maintain combinations of open and closed switches representative of the current month and current day of the month.

These and other objects and advantages of the invention will be more fully understood from the following description and the accompanying drawings. It should be understood, however, that the description and drawings are illustrative only, and are not intended to limit the invention, except insofar as it is limited by the claims.

In the drawings:

FIGURE 2 is a somewhat diagrammatic view illustrating the arrangement of lamps on the display panel;

FIGURE 3 is a fragmentary plan view showing several of the banks of control switches and the means for raising and lowering them to render them effective or ineffective, as desired;

FIGURE 4 is an enlarged fragmentary sectional view taken on the line 4—4 of FIGURE 3;

FIGURE 5 is an enlarged fragmentary sectional view taken on the line 5—5 of FIGURE 3;

FIGURE 6 is a fragmentary sectional view taken on the line 6—6 of FIGURE 5;

FIGURE 7 is a chart illustrating the sequence of operation of the switch lifting means and the main power supply breakers;

FIGURE 9 is a diagrammatic view illustrating the shape of the several cams that operate the circuit control switches in the date indicating mechanism.

Figure 1:
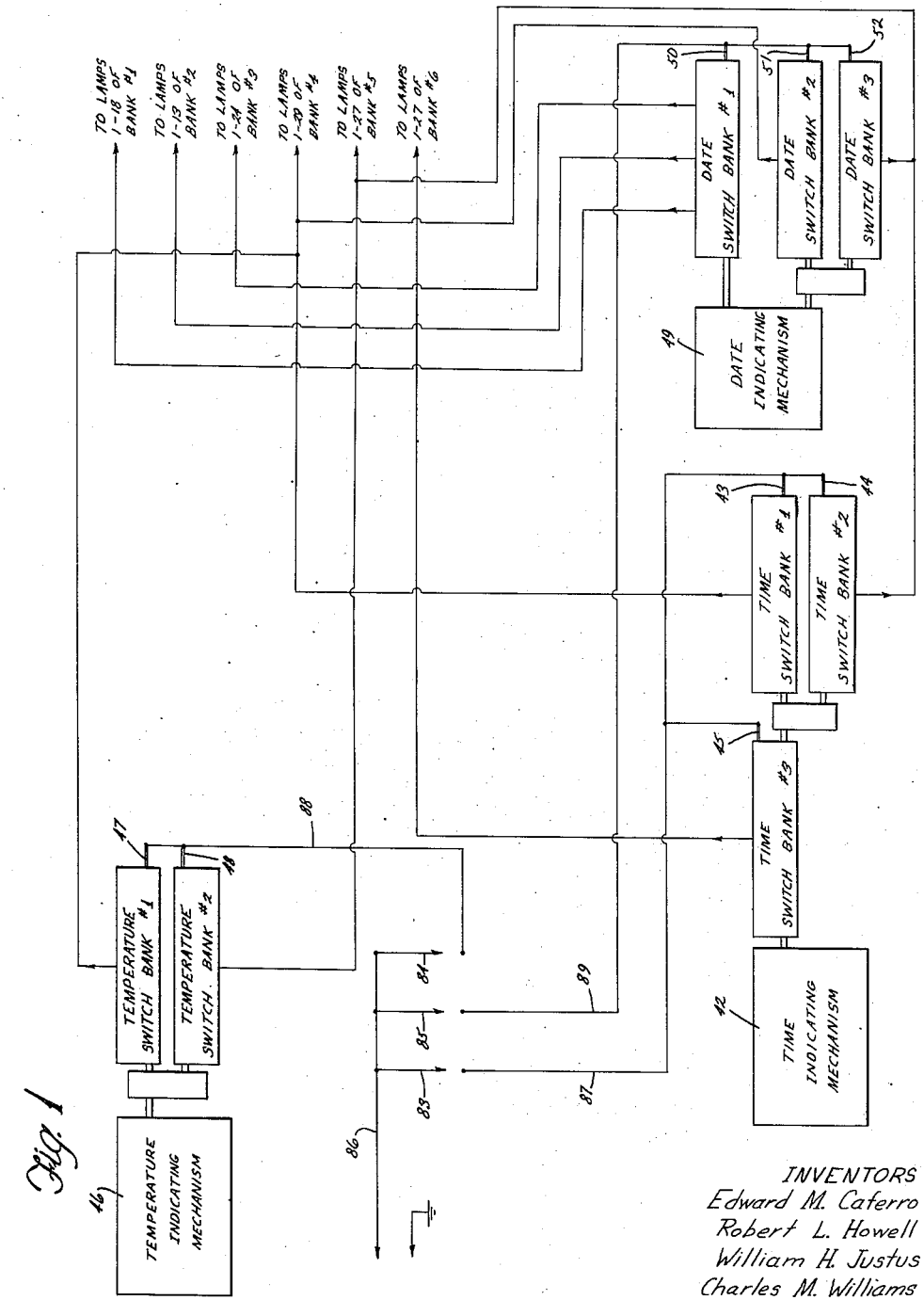
FIGURE 1 is a diagrammatic view of the control mechanism for our display device, showing the general circuit connections therein.

The function of the present invention is to create, on a single display panel, successive displays of the correct time, the present temperature and the current date. According to our invention, these several displays are spelled out on a display panel such as that shown at 40 in FIGURE 2 by selective illumination of lamps 41 provided on the panel 40. As illustrated in FIGURE 2, the lamps 41 are arranged in six banks on the display panel. The banks are identified, and will hereinafter be referred to as lamp banks 1, 2, 3, 4, 5 and 6.

The lamps 41 of each bank are connected in a plurality of separate circuits. The numbers on the lamps 41 in FIGURE 2 represent the circuits in which they are connected. It should be understood that the banks are independent of each other and that no lamps of one bank are connected to lamps of another. The fact that some lamps of bank 1, for example, bear numbers which are identical to numbers on lamps of bank 2 does not mean that these lamps are connected together.

By selective energization of the circuits of each bank, the lamps therein may be made to display a letter or figure. Lamp banks 1, 2 and 3 are utilized only in the date display to display three letter abbreviations of the twelve months of the year. Each of these lamp banks is capable of displaying one letter of each of these abbreviations.

Lamp bank 4 is utilized in each of the time, temperature and date displays. In the time display, numbers from one to twelve are displayed on bank 4 to represent hours of time. In the temperature display, numbers from zero to twelve are displayed on bank 4 to represent ten degree units of temperature. In addition, the lamps marked 29 and 30 may be energized to display a minus sign to indicate sub-zero temperature. In the date display, lamp bank 4 is used to display numbers from one to three which represent the first number of two-number dates.

Lamp bank 5 is also used by each of the three information indicating mechanisms. In the time display numbers from zero to five are displayed on bank 5 to represent ten minute intervals of time. In the temperature display numbers from zero to nine are displayed on bank 5 to represent unit degrees of temperature. In the date display numbers from zero to nine are formed on bank 5 to represent single-number dates and the last number of double-number dates.

Lamp bank 6 is used only during the time display to display numbers from zero to nine to represent minutes of time. The temperature and date displays are completed on bank 5.

To create displays of the time, temperature and date on the panel 40, three separate mechanisms are employed. FIGURE 1 diagrammatically illustrates these mechanisms and the circuit in which they are joined. In FIGURE 1, the box identified by the numeral 42 indicates the time indicating mechanism. This mechanism is adequately shown and described in the prior and co-pending application of Edward M. Caferro and William H. Justus, Ser. No. 627,261, filed Dec. 10, 1956, and will not be described in detail herein. The mechanism 42 includes a group of control switches that are manipulated by the mechanism 42 to constantly maintain combinations of open and closed switches representative of the correct time. The operating mechanisms for manipulating this group of switches comprise cams and cam shafts are described in the above mentioned prior patent application.

The group of control switches associated with time indicating mechanism 42 is broken into three switch banks, identified as time switch banks 1, 2 and 3. Time switch bank 1 includes one switch connected to each of the lamp circuits of lamp bank 4. All of the switches of bank 1 are adapted to close against and receive power from a common bus bar 43. Switch bank 1 of the time indicating mechanism 42 is adapted to display, in figures, the correct hour of time on lamp bank 4. Time switch bank 2 includes one switch connected to each of the lamp circuits of lamp bank 5. All of the switches of bank 2 are adapted to close against and receive power from a common bus bar 44. This switch bank controls the lamps of lamp bank 5 to display figures representing ten minute intervals of time. Time switch bank 3 contains a plurality of switches, one connected to each lamp circuit of lamp bank 6. The switches of switch bank 3 contact a common bus bar 45 and receive power therefrom to light the lamps of lamp bank 6 to display minutes of time. The means for energizing the bus bars 43, 44 and 45 will be described later herein.

The box identified by the numeral 46 in FIGURE 1 represents the temperature indicating mechanism. This mechanism is shown and described in detail in the above mentioned prior and co-pending application. Its function is to sense present temperature and manipulate an associated group of control switches in accordance therewith to constantly maintain combinations of open and closed switches representative of present temperature. The group of control switches associated with the temperature indicating mechanism 46 comprises two banks of cam operated switches, identified as temperature switch banks 1 and 2. Temperature switch bank 1 contains a plurality of switches, each connected to one of the lamp circuit of lamp bank 4 and adapted to control the lamps of bank 4 to display numbers indicating ten degree units of temperature. The switches of temperature switch bank 1 are adapted to contact and receive power from a common bus bar 47. Temperature switch bank 2 contains a plurality of switches each connected to and adapted to control one of the lamps of lamp bank 5 on the panel 40. The switches of temperature switch bank 2 are manipulated by the mechanism 46 to cause the lamps they control to display one degree units of temperature. The switches of this bank receive power from a common bus bar 48.

The box 49 in FIGURE 1 represents a date indicating mechanism which will be fully described later herein. This mechanism includes a third group of control switches adapted to control certain of the lamp banks to display the present date. The group of control switches associated with the date indicating mechanism comprises three banks of cam operated switches indicated as date switch banks 1, 2 and 3. Date switch bank 1 is adapted to control lamp banks 1, 2 and 3 to display three letter abbreviations of the twelve months of the year thereon. Date switch bank 1 has a switch therein for each of the lamp circuits of lamp banks 1, 2 and 3. These switches are cam operated by the date mechanism 49 to maintain combinations of open and closed switches operable to light the lamps of banks 1, 2 and 3 to spell out a three letter abbreviation of the present month. All of the switches of date switch bank 1 are adapted to close against and receive power from a common bus bar 50.

Date switch bank 2 is adapted to control lamp bank 4 to display the first number of double number dates, that is, dates from the tenth to the end of each month. The switches of date switch bank 2 contact and receive power from a common bus bar 51.

Date switch bank 3 is adapted to control the lamps of bank 5 to display single number dates and the last number of double number dates. The switches of this bank, when closed, contact and receive power from a common bus bar 52.

The successive displays of time, temperature, and date are created by selective energization of the bus bars 43, 44, 45, 47, 48, 50, 51 and 52. When the correct time is to be displayed, bus bars 43, 44 and 45 are energized. When temperature is to be displayed, bus bars 47 and 48 are energized. When the current date is to be displayed, bus bars 50, 51 and 52 are energized. In each case current flows from the energized bus bars and through the switches closed against the bus bars to light appropriate lamps 41 on the panel 40.

It will be remembered that the switches in time switch bank 1, the switches in temperaturre switch bank 1 and the switches in date switch bank 2 are all connected to the lamp circuits of lamp bank 4. These switch banks are actually alternate power sources for the lamp circuits of bank 4. Likewise, the switches of time switch bank 2, temperature switch bank 2 and date switch bank 3 are all connected to the lamp circuits of lamp bank 5. This means that the switches of time bank 1, temperature bank 1 and date bank 2 are electrically connected together, and that the switches of time bank 2, temperature bank 2 and date bank 3 are electrically connected together. Therefore, unless isolating means are provided, energization of any of the switch banks so tied together will cause energization of all of those switch banks and will result in an unintelligible display upon the lamp banks. To prevent this undesirable result, we provide means for lifting and opening all of the switches of each of the switch banks that are paralleled with others during the periods when it is not intended that they control the lamp banks. The lifting means release the switches only during the periods when they are to control the lamps to display the information they are set to display.

The switch lifting means are shown in FIGURES 3, 4, 5 and 6. As shown in FIGURES 3 and 4, the switches in each switch bank comprise current carrying spring metal straps 53 anchored at one end to a phenolic base block 54 by screws 55. Each strap 53 has a contact point 56 at its free end which is adapted to close against a contact 56a on the bus bar associated with that particular switch bank. Each switch bank has a cam shaft such as the one shown at 57 in FIGURE 4 extending therebeneath. The shaft 57 has a plurality of cams 58 fixed thereon. The switch straps 53 have followers 59 depending therefrom and engaging the cams 58. As the cam shafts 57 are rotated by the indicating mechanisms, the cams 58 manipulate the switches accordingly.

It will be seen in FIGURE 3 that time switch banks 1 and 2 are mounted in close proximity one to the other, with the contact carrying ends of the switch straps 53 facing inwardly and with the bus bars 43 and 44 positioned a short distance apart. Temperature switch banks 1 and 2 and date switch banks 2 and 3 are arranged in the same relationship. Between the time switch banks 1 and 2 several posts 60 are provided. The posts 60 have apertures 61 at their lower ends which receive pins 62. The pins 62 are mounted upon the supporting base for the various mechanisms that make up the device. The pins 62 support the posts 60 for axial movement thereon. Each of the posts 60 has a shoulder 63 thereon intermediate its ends. Lifting combs 64 are mounted upon the posts 60 against the shoulders 63, as shown in FIGURE 4. The combs 64 extend outwardly from the posts 60 on each side, beneath the bus bars 43 and 44 and above the cam shafts 57. The combs 64 are notched as shown at 65 to clear the several cams 58 on the shafts 57. The cam followers 59 are substantially wider than the cams 58, and overlie the portions of the combs 64. Thus, if the combs 64 are raised by raising the posts 60, the followers 59 will be engaged and raised, thus opening all of the switches on time switch banks 1 and 2. The amount of lift need not be great, but only enough to insure that those switches which were formerly closed, are opened.

As shown in FIGURE 3, similar lifting combs 64 are provided between temperature switch banks 1 and 2 and between date switch banks 2 and 3 to lift the closed switches of these banks when necessary.

To operate the lifting combs 64 actuating shafts 66, 67 and 68 are journalled above the pairs of flanked switch banks. The shafts have lever arms 69 fixed thereto and extending radially toward the posts 60. Connection pins 70 pivot the free ends of the levers 67 to the tops of the posts 60. By rotating the shafts a few degrees, the levers 69 can be caused to lift and lower the posts 60 and lifting combs 64. FIGURES 5 and 6 illustrate the means for rocking the shafts 66–68. As shown, each shaft 66–68 has at one end, an upstanding arm 71 to which is pivoted an actuating link 72. Each link 72 extends to a rocker mechanism 73, one for each link 72. Each includes a cam 74 mounted upon a shaft 75 within a casing 76. Each housing has a second shaft 77 journalled therein which carries a cam follower arm 78 having a roller 79 thereon. The roller 79 rides on the operating surface of the cam 74. An actuating arm 80 is fixed to the shaft 77 outside the casing 76 and is connected to the link 72.

The cams 74 have reduced diameter portions 74a thereon which cover precisely one third of the circumference of the cams. When the rollers 79 are riding against these portions 74a, the links 72 maintain their combs 64 in lowered position. When the rollers 79 ride on the increased diameter portions, the links 72 maintain their combs 64 raised to open the switches contacted thereby. As shown in FIGURE 3 the three cam shafts 75 are drivingly coupled together by couplers 81. A motor 82 is drivingly connected to the shafts 75 to rotate them at a constant speed. The cams 74 on the shafts 75 are adjusted on their shafts 75 so that the reduced diameter portions 74a are staggered with respect to each other. As the motor 82 rotates the shafts 75, the cams operate in sequence to lower the combs 64 connected to the time switch banks, then the combs 64 connected to the temperature switch banks, and finally the combs 64 connected to the date switch banks. During the period when any one of the three rocker mechanisms is maintaining its combs 64 lowered, the other two are maintaining their combs raised, so that only one of the three groups of switches is operative at a time.

As hereinbefore mentioned, the bus bars of the three groups of switches are energized in succession to supply power to the switch banks of the three indicating mechanism, one at a time. The means for energizing these bus bars will now be described. As diagrammatically illustrated in FIGURE 1, and as shown in FIGURE 3, a plurality of main breaker switches 83, 84 and 85 are provided. These switches are all connected by a lead 86 to a power source capable of supplying current at the proper voltage for lighting the lamps 41 on the panel 40. The breaker switch 83 is connected by a lead 87 to the bus bars 43, 44 and 45 that power time switch banks 1, 2 and 3. Breaker switch 84 is connected by a lead 88 to bus bars 47 and 48 of the temperature indicating mechanism. Breaker switch 85 is connected by a lead 89 to bus bars 50, 51 and 52 of the date indicating mechanism.

The main breaker switches 83, 84 and 85 are opened and closed by cams 90 on a shaft 91. The shaft 91 is driven by the motor 82 through the rocker mechanism shafts 75 and at the same speed as the shafts 75. The cams 90 are shaped and oriented on the shaft 91 to close the breakers 83, 84 and 85 in repeating sequence, one at a time. The cams 90 are so arranged on the cam shaft 91 that the breaker 83 is closed during the time that the lifting combs 64 on the time switch banks 1 and 2 are lowered, and the breaker 84 is closed during the time that the lifting combs 64 on the temperature switch banks 1 and 2 are lowered and the breaker 85 is closed during the time the lifting combs 64 on the date switch banks 2 and 3 are lowered. The bus bars of the three groups of control switches are thus energized only during the periods when the switches of each group are effective to control the lamps 41 on the display panel 40.

To prevent arcing at the contact points of the several switches of each of the three switch groups as the lifter combs 64 operate to lift and lower the switches, we shorten the periods during which the breakers 83–85 are closed and provide for short delay periods between the opening of one of the breakers 83, 84 and 85 and the closing of another. During these delay periods, the lifting combs 64 are operated to raise and lower their switch groups. The switches are thus manipulated at a time when no current is passing therethrough and no destructive arcing is possible. The chart of FIGURE 7, best illustrates the timing and operation of the lifting combs 64 and breaker switches 83–85. The horizontal axis or ordinant of the chart represents the degrees of rotation of the shafts 75 and 91. One complete revolution, or 360 degrees on the chart represents one complete display cycle during which time temperature and date are displayed. The time display occurs during the first 120 degrees of rotation, the temperature display occurs during the second 120 degrees, and the date display occurs during the third 120 degrees. The heavy lines marked "Time Lifters Down," "Temp. Lifters Down" and "Date Lifters Down" represent the periods during which the combs 64 of the three groups of switches are lowered. At all other times, they are raised to maintain their switch groups open. The lifter lines marked "Breaker 83 Closed," "Breaker 84 Closed" and "Breaker 85 Closed" indicate the periods during which those breakers are closed. At all other times, they are open.

Examination of the chart of FIGURE 7 will show that as the display cycle starts, the lifting combs 64 connected with time switch banks 1 and 2 are lowered to render these switch banks effective. The lifting combs 64 connected with the temperature and date switch banks are raised. After about 5 degrees of rotation, the breaker 83 is closed to energize the time switch bus bars 43, 44 and 45 to create the display on the panel 40. At about 115 degrees, the breaker 83 is opened to end the time display. At 120 degrees the lifting combs 64 connected with the time switch banks are raised, and the combs 64 connected with the temperature switch banks are lowered. At about 125 degree breaker switch 84 is closed to create the temperature display. The termination of the temperature display and creation of the date display occur in similar fashion, as clearly indicated on the chart.

As hereinbefore stated, the time indicating mechanism 42 and the temperature indicating mechanism 46 are fully described in the co-pending application, Ser. No. 627,261 and will not be described in detail herein. The novel date indicating mechanism 49, however, is disclosed in detail in FIGURE 8. This mechanism will now be described.

In order to maintain proper combinations of open and closed switches on date switch banks 2 and 3 to display numbers indicating the present day of the month, it is necessary to manipulate the switches of date switch banks 2 and 3 once every 24 hours to set up the proper open and closed switch combinations. This manipulation is accomplished by a motor 95 shown in FIGURE 8. The motor 95 drives a cam shaft 96 which has cams (not shown) thereon that manipulate the switches of date switch bank 3. The cam shaft 96 and its cams are similar to the shaft 57 and cams 58 shown in FIGURE 4. The shaft 96 is coupled, through a suitable gear train 97, to a cam shaft 98 which manipulates the switches of date switch bank 2 so that both these banks are controlled by motor 95.

The cams on shaft 96 are arranged to set up switch combinations on bank 3 operable to display numbers from zero to nine successively during one revolution of shaft 96. By rotating shaft 96 one tenth of one revolution, at a time succeeding numbers can be displayed. The drive train 97 is adapted to rotate the shaft 98 one quarter revolution for each complete revolution of the shaft 96. The cams on shaft 98 are arranged to open all switches in bank 2 at one position, hereinafter called "blank"

position, and to set up switch combinations to display the numbers, one, two and three at the other three positions. It will be apparent that with this construction, operation of the motor 95 to rotate shaft 96 in successive one-tenth revolution steps will result in manipulation of switch banks 2 and 3 to cause displays on lamp banks 4 and 5 of numbers from zero to thirty nine.

The motor 95, which controls switch banks 2 and 3 is energized once during each 24 hour period to rotate the shaft 96 one-tenth of one revolution to change the date display one day. The means for energizing the motor 95 are controlled by the time indicating mechanism. As described earlier herein, the time switch bank 1 is manipulated by mechanism 42 to maintain switch combinations representing hours of time.

As described in the prior and co-pending application mentioned earlier herein, the switches of this switch bank are manipulated once each hour to set up switch combinations representing numbers from one to twelve. According to the present invention, two additional switches 99 and 100, are included in this switch bank, as shown diagrammatically in FIGURE 8. These switches are adapted to close against a bus bar 101 which is connected by a line 102 to a power source 103. Switch 99 is manipulated by the cam and cam shaft means of time switch bank 1 in such a manner that it is closed momentarily once each twelve hours, as time switch bank 1 is manipulated to change its open and closed switch combination to show an hour change. Preferably this momentary closing of switch 99 occurs as the hour changes from ten to eleven. Switch 100 is manipulated in the same manner to be momentarily closed as the hour changes from eleven to twelve. That is to say, switch 100 is momentarily closed precisely at noon and midnight each day.

Figure 8:
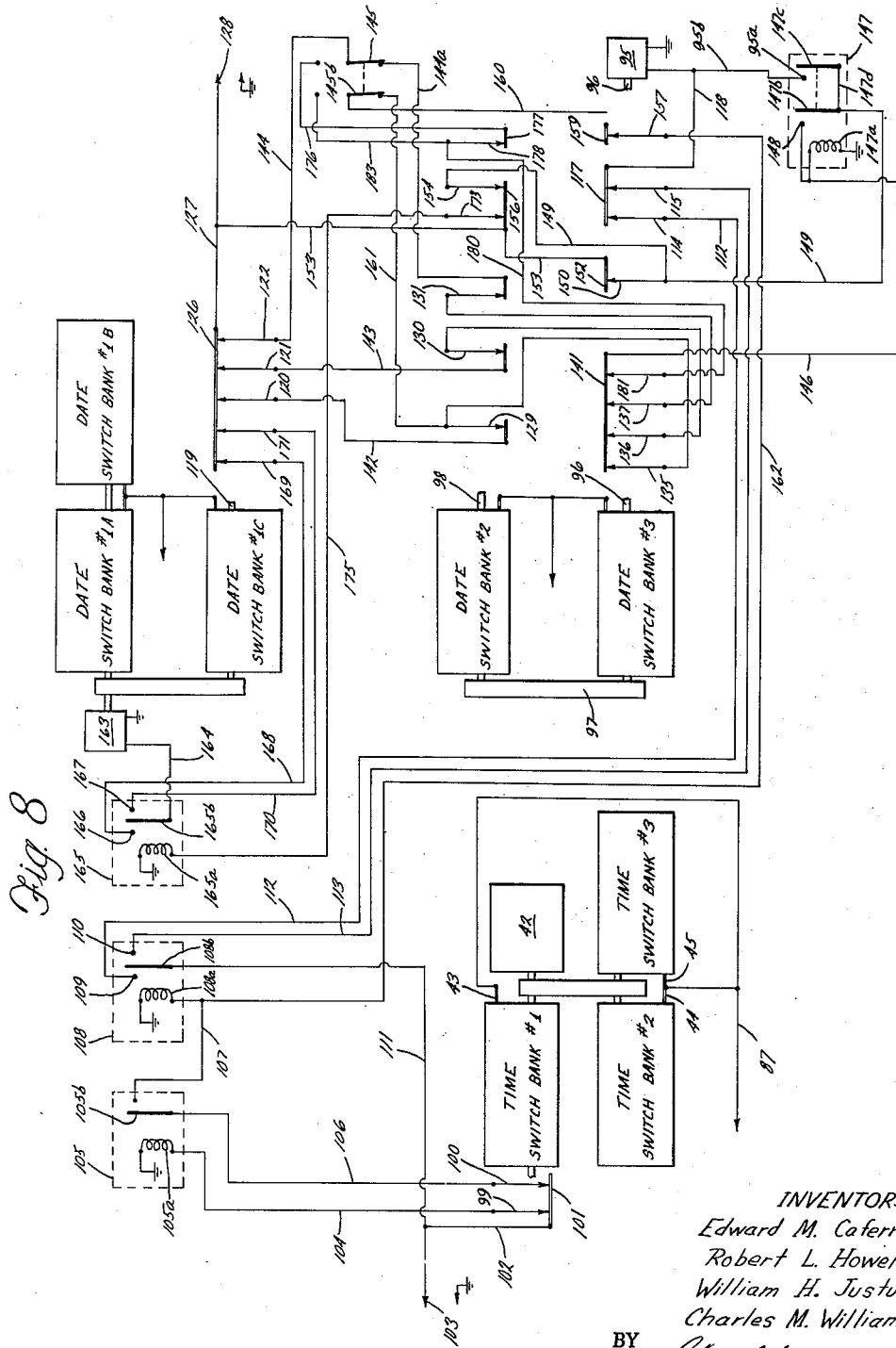
FIGURE 8 is a schematic diagram showing the circuit connections in the date indicating mechanism.

As shown in FIGURE 8, switch 99 is connected by a lead 104 to the coil 105a of a relay 105. The relay 105 has a single pole, single throw switch 105b and is of the well known ratchet type wherein one impulse or energization of the coil 105a opens switch 105b and a second impulse or energization closes switch 105b. The switch remains opened or closed between impulses. The relay 105 is adjusted so that the impulse received from the momentary closing of switch 99 at eleven o'clock a.m. opens switch 105b and the impulse received by closing switch 99 at eleven o'clock p.m. closes switch 105. Switch 105b is thus open at noon and closed at midnight.

Switch 100 is connected to relay switch 105b by line 106. When both switches 100 and 105b are closed, current will flow from power source 103 through switch 105b. As described, switch 100 is closed at noon and midnight but switch 105b is closed only at midnight. Current will flow through switch 105b only at midnight. It is the momentary current flow through switch 105b that initiates a date change.

As shown in FIGURE 8, switch 105b is connected by a line 107 to the coil 108a of a second ratchet relay 108. The relay 108 includes a switch 108b which is operable, upon energization of the coil 108a to be moved between a contact 109 and a contact 110. Each impulse fed to the coil 108a causes the switch 108b to be moved from one contact to the other. The switch 108b is connected by a line 111 to the power source 103. The contacts 109 and 110 are connected by lines 112 and 113 respectively, which extend to cam operated switches 114 and 115. The switches 14 and 115 are positioned at one end of date switch bank 3. Each is manipulated by a cam 116 fixed on the shaft 96. The cams 116 are identical in shape, each having five equally spaced lobes 116a thereon as shown in FIGURE 9. They are, however, fixed on the shaft 96 so that the lobes 116a of one are staggered with respect to the lobes 116a of the other. Thus, at any of the ten positions of the shaft 96, one of the switches 114 and 115 is open and the other is closed. As the shaft 96 rotates one tenth of one revolution, that switch 114 or 115 which was closed will open and the other will close.

The switches 114 and 115 are adapted to close against a bus bar 117. The bus bar 117 is connected by a lead 118 to the motor 95 which drives the shaft 96. Operating current for the motor 95 flows from the power source 103 through the switch 108b, through one of the switches 114 and 115, and through the bus bar 117 to the motor 95. The relay switch 108b is adjusted with respect to the cam switches 114 and 115 so that it is normally closed against the contact 109 or 110 which is connected to that switch 114 or 115 which is open. Then, when a date change is initiated by impulsing the coil 108a, the switch 108b is moved against the opposite contact, and connected to that switch 114 or 115 which is closed, permitting current to flow from the source 103 to the motor 95. The motor will rotate until the closed switch 114 or 115 is opened, that is, one tenth of one revolution. This rotation will cause the necessary adjustment of switch banks 2 and 3 to change the date.

To illustrate this operation, consider that switch 114 is closed on odd numbered days and switch 115 is closed on even numbered days. Assume that the present date is January 1, and it is approaching midnight. At this time, switch 114 will be in closed position and switch 115 will be open. Relay switch 108b will be closed against contact 110, in electrical connection with open switch 115. No current will be flowing to motor 95. At 12:00 midnight, a pulse current will flow through line 107 to relay coil 108a as hereinbefore explained. This pulse will cause the ratchet relay 108 to move switch 108b against contact 109, closing a circuit from source 103 through lines 111 and 112, closed switch 114, bus bar 117 and line 118 to motor 95. Motor 95 will rotate one tenth of one revolution and open switch 114, thereby cutting off its power. This will change the date display from January 1, to January 2. It will also close switch 115, but since ratchet relay switch 108b is now engaged with contact 109, no current will flow. The switches will remain in this position until midnight of January 2 when another impulse from line 107 will cause the switch 108b to move against contact 110 and close a circuit through closed switch 115, causing another date change.

It will be noticed that with this mechanism, a date change is unfailingly performed upon reception by coil 108a of an impulse sufficient to cause relay 108 to operate. The performance does not depend upon the length of the impulse, and once started, it will not be ended until a sufficient rotational adjustment of shaft 96 has occurred.

At the end of each month it is necessary to adjust date switch bank 1 to change the combination of switches thereon to show a month change. It will be understood that date switch bank 1, which controls the month display, is constructed in the same manner as the several other switch banks and is operated by cams (not shown) on a cam shaft 119. In actual practice, the date switch bank 1 is divided into several sections and there are a plurality of shafts 119. All are coupled together and rotate at the same speed, however, and for convenience they will be herein referred to as one cam shaft 119. Since there are twelve months in a year, the cams on cam shaft 119 are shaped to manipulate the switches of date switch bank 1 to set up twelve different combinations during one complete revolution. Each one twelfth revolution of the cam shaft 119 is sufficient to advance the date display from one month to the next consecutive month.

The means for rotating the cam shaft 119 will be described later herein. It is believed that the operation of the device will be best understood if it is assumed, for the present, that the shaft 119 rotates one twelfth of one revolution at midnight of the last day of each month to adjust the switches of date switch bank 1 to display an abbreviation of the following month.

In providing a date display, consideration must be made of the fact that some months have 31 days, some have 30 days, and one has only 28 days. Since date switch banks 2 and 3 are capable of displaying numbers from 1 to 39 it is possible to display proper dates for all months. It is necessary, however, at the end of each month to accelerate the rotation of shaft 96 at midnight of the proper day and cause it to rotate to a position where the single number 1 will be displayed, to represent the first date of the following month. This acceleration may occur at midnight on the 31st, the 30th or the 28th, depending upon the month. The means for causing this acceleration at midnight of the proper day for each month will now be described. As shown in FIGURE 8, three cam operated switches 120, 121 and 122 are provided at the date switch bank 1. Cam shaft 119 extends beneath these three switches. Cams 123, 124 and 125, shown in detail in FIGURE 9, are fixed on cam shaft 119 beneath switches 120, 121 and 122 respectively to open and close the switches as cam shaft 119 is rotated. Switch 120 is intended to be closed only during those months which have 31 days. Accordingly, cam 123 has seven depressions 123a formed in the operating surface thereof to close switch 120 during the months of January, March, May, July, August, October and December. Switch 121 is intended to be closed only during those months which have thirty days. Accordingly cam 124 has four depressions 124a formed in the operating surface thereof to close switch 121 during the months of April, June, September and November. Switch 122 is intended to be closed only during that month which has 28 days. Accordingly cam 125 has a single depression 125a cut therein to close switch 122 during the month of February. Switches 120, 121 and 122 are all adapted to close against a common bus bar 126. The bus bar 126 is connected by a line 127 to a power source 128. Any switch 120, 121 or 122 which is closed will receive current from the bus bar 126. Thus, during the months having 31 days switch 120 will carry current. During months having 30 days switch 121 will carry current. During the month of February switch 122 will carry current.

As shown in FIGURE 8 three additional switches 129, 130 and 131 are positioned at the end of date switch bank 2. Cam shaft 98, which controls the switches of date switch bank 2, extends beneath these three additional switches 129, 130 and 131. Cam shaft 98 has cams 132, 133 and 134 fixed thereon beneath switches 129, 130 and 131 respectively. Switch 129 is intended to be closed when cam shaft 98 is in position to maintain switch combinations on date switch bank 2 representing the number 3. Cam 132 is therefore provided with a single depression 132a positioned to close switch 129 when cam shaft 98 is rotated to a position to cause the switches of date switch bank 2 to display the number 3. Switch 130 is also intended to be closed during the time that date switch bank number 2 is displaying the number 3. The cam 133 that controls switch 130 is shaped in exactly the same manner as cam 132. Switch 131 is intended to be closed during the time that the number 2 is displayed by date switch bank 2. The cam 134 that controls the switch 131 is therefore provided with a depression 134a positioned to close switch 131 when cam shaft 98 is in position to cause the switches of date switch bank number 2 to display the number 2.

At the end of date switch bank number 3 three cam operated switches 135, 136 and 137 are provided. Switches 135, 136 and 137 are positioned above cam shaft 96. Cams 138, 139 and 140 are fixed on cam shaft 96 in position to manipulate the three switches 135–137 respectively. These cams are shown in detail in FIGURE 9. Switch 135 is intended to be closed only when cam shaft 96 is in position to cause the switches of date switch bank 3 to display the number 2. Accordingly cam 138 is provided with a single depression 138a positioned to close switch 135 at this point. Switch 136 is intended to be closed only when cam shaft 96 is in position to cause the switches of date switch bank number 3 to display the number 1. Accordingly cam 139 is provided with a single depression 139a positioned to close switch 136 at this point. Switch 137 is intended to be closed only when cam shaft 96 is in position to cause the switches of date switch bank 3 to display the number 9. Accordingly cam 140 is provided with a single depression 140a positioned to close switch 137 at this point. The switches 135, 136 and 137 are adapted to close against a common bus bar 141. The bus bar 141 is adapted to be energized through one of the switches 135–137. Energization of the bus bar 141 will initiate an acceleration of the shafts 96 and 98 to re-index date switch banks 2 and 3 to display the single number 1, as will be described later herein.

As shown in FIGURE 8, the switch 120 at the end of date switch bank 1 is connected by a line 142 through the switch 129 and to the switch 135. Current will flow from the power source 128 through the switches 120, 129 and 135 to energize bus bar 141 only when all three of these switches are closed. Switch 121 is connected by a line 143 through switch 130 and to switch 136. When all three of these switches are closed current will flow from the source 128 through the line 143 and to the bus bar 141. Switch 122 is connected by a line 144 to one pole of a double pole switch 145, the purpose of which will be described later. The switch 145 is normally closed against a line 144a which extends through the switch 131 and to switch 137. When switches 122, 131 and 137 are closed current will flow from the source 128 to the bus bar 141. By means of these last described switches at the ends of date switch banks 1, 2 and 3, the acceleration of cam shafts 96 and 98 can be made to occur at the proper time each month. Assume, for example, that the month is January. Since January is a month having 31 days, switch 120 will be closed throughout the month. Switches 121 and 122 will be open. On January 30th, as shaft 98 moves to change the display on date switch bank 2 from a 2 to a 3, switch 129 will be closed. Switch 129 will remain closed so long as the 3 is displayed on switch bank 2. At midnight of January 31st as motor 95 rotates cam shaft 96 to change the display of switch bank 3 from a 1 to a 2, switch 135 will be closed. As soon as switch 135 is closed a circuit is established from source 128 through switches 120, 129 and 135 to energize bus bar 141. Energization of bus bar 141 will cause motor 95 to operate until switch banks 2 and 3 are set to display the single number 1, as will hereinafter be described. Since neither switches 121 and 122 are closed during the month of January, the circuit path through switches 120, 129 and 135 is the only path to bus bar 141 and the acceleration can only occur at midnight of January 31st.

During February switch 122 is the only switch of the group 120, 121 and 122 which will be closed. On February 20th when cam shaft 98 operates to set the switches of date switch bank 2 to display the number 2 switch 131 will be closed. At midnight of February 28th as cam shaft 96 operates to change the display of date switch bank number 3 from an 8 to a 9, switch 137 will be closed, establishing a circuit path from the source 128 through switches 122, 131 and 137 to energize bus bar 141 and cause the acceleration.

During a month such as April which has only 30 days, switch 121 on date switch bank 1 will be closed. Switches 120 and 122 will be open. On April 30th switch 130 will be closed by action of cam shaft 98. On midnight of April 30th as cam shaft 96 operates to change the display on date switch bank 3 from a zero to a 1, switch 136 will be closed, establishing a circuit path from source 128 through switches 121, 130 and 136 to energize bus bar 141. It will be understood from the foregoing that the several switches just described will always operate to energize bus bar 141 at midnight of the proper day of each of the twelve months of the year.

The means for causing motor 95 to rotate cam shafts 96 and 97 to a position to show the single number 1 will now be described. As shown in FIGURE 8, bus bar 141 is connected by a line 146 to the coil 147a of a relay 147. The relay 147 includes two switches 147b and 147c that are closed during the time that coil 147a is energized. The switch 147b is adapted to close against a contact 148 which is electrically connected to line 146 and to the coil 147a. The switch 147b is connected by a line 149 to a cam operated switch 150 which is mounted at the end of date switch bank 3. Switch 150 is manipulated by a cam 151 (see FIGURE 9) fixed on cam shaft 96. Cam 151 is shaped to maintain switch 150 closed at all times save when shaft 96 is in position to cause switch bank 4 to display the number one on the display panel. When switch 150 is closed, it contacts a bus bar 152 that is connected by a line 153 to the power source 128.

As shown in FIGURE 8, line 149, to which relay switch 147b is connected, extends to another cam operated switch 154, mounted at the end of date switch bank 2. Switch 154 is controlled by a cam 155 on cam shaft 98. The cam 155, as shown in FIGURE 9, is shaped to maintain switch 154 closed at all times save when the cam shaft 98 is in the "blank" position where no number is displayed by switch bank 2. Switch 154 closes against a bus bar 156 which is connected to the line 153 that couples bus bar 152 to power source 128.

With the circuit connections just described, cam switches 150 and 154 provide parallel current paths from the power source 128 to relay switch 147b. When either or both of switches 150 and 154 are closed, current will flow from source 128 to switch 147b. If, at a time when either switches 150 and 154 are closed, an impulse is sent to relay coil 147a from bus bar 141 causing switch 147b to be closed, current will flow from source 128 through closed switch 147b and from it through relay coil 147a to ground, maintaining relay coil 147a energized, and holding switch 147b closed.

Relay switch 147c is ganged with switch 147b and closes therewith. Switch 147c is electrically tied to switch 147b by line 147d. When closed, switch 147c contacts a contact point 95a that is connected by a line 95b to motor 95. It will be seen that when switches 147b and 147c are closed, and while either cam switch 150 or 151 is closed, current will flow from source 128 to motor 95, causing it to rotate shafts 96 and 98. Motor 95 will operate until its current supply is cut off by opening of both switches 150 and 154. As described earlier herein, both switches 150 and 154 will be opened only when date switch banks 2 and 3 are in position to display a "blank" and the number one respectively, signifying the first day of the month.

It should be apparent from the foregoing that once a current path is established through one of the three end-of-the-month switch groups 120, 129, 135, or 121, 130, 136 or 122, 131, 137 to energize the bus bar 141, the resulting impulse of current flowing to the relay 147 will actuate switches 147b and 147c to establish a circuit to the motor 95 and cause it to rotate cam shafts 96 and 98 until they are in position to cause date switch banks 2 and 3 to display the single number one. At the time the relay 147 is operated to initiate an end of the month change, date switch banks 2 and 3 are in positions to display the number twenty-eight, thirty, or thirty-one. In the first two of these positions, both switches 150 and 154 will be closed to establish a circuit to motor 95. If the banks are set to display a thirty-one, switch 150 will be open but switch 154 will be closed, so a circuit path will still be established to motor 95. Motor 95 will be stopped only when both switches 150 and 154 are opened.

It will be remembered that the ordinary day to day indexing of cam shafts 96 and 98 is accomplished through relay 108 and cam switches 114 and 115. Switch 114 is closed on odd numbered days and switch 115 is closed on even numbered days. This mechanism operates successfully to index the shafts 96 and 98 only so long as an odd numbered day follows an even numbered day. It is not upset by an end of the month acceleration of the rotation of shafts 96 and 98 provided that acceleration occurs at the end of an even numbered day, as is the case with 28 or 30 day months, but it is upset by an end of the month change if that change occurs on an odd numbered day. On January 31st, for example, switch 114 is closed, and relay switch 108b is closed against contact 110. At midnight, switch 108b will close against contact 109 and energize motor 95, rotating shafts 96 and 98 to display the number thirty-two. This movement closes a circuit through switches 120, 129 and 135 as hereinbefore described and starts an end of the month change which causes the shafts 96 and 98 to rotate to positions which will cause switch banks 2 and 3 to display a blank and a one, respectively. Now, when bank 3 is set to display a one, switch 114 will be closed again, it being closed on odd numbered days. Relay switch 108b, however will still be closed against contact 109 instead of against contact 110 as it should be, on odd numbered days. Unless this is remedied, malfunction of the device will result. To prevent malfunction, it is necessary to send an additional impulse to coil 108a each time an odd numbered day follows an odd numbered day, that is, at the end of each 31 day month. The extra impulse will manipulate switch 108b to close it against contact 110, as it should be on the first day of each month.

This impulse is created by means of a cam switch 157 located at the end of date switch bank 3. Switch 157 is controlled by a cam 158 fixed on shaft 96. Cam 158, as shown in FIGURE 9, is shaped with a single depression 158a positioned to close switch 157 momentarily as cam shaft 96 moves from a position where it causes date switch bank 3 to display a three to a position where it causes this bank to display a four. That is to say, the cam 158 momentarily closes switch 157 at about midnight on the 3rd, 13th, 23rd and 33rd (during the end-of-the-month change) of each month. Switch 157 closes against a bus bar 159 which is connected by a line 160 through one pole 145b of the double pole switch 145 to a line 161 that is connected to cam switch 129 at the end of date switch bank 2. It will be apparent that only on and after the 30th of 31 day months, when switch 129 is closed and energized, bus bar 159 will be energized. Thus, during the end of the month change at the end of each 31 day month, and as motor 95 is rotating shafts 96 and 98 through positions where they would cause a display of the numbers thirty-three and thirty-four, switch 157 will be momentarily closed against its energized bus bar, to receive an impulse of current. This impulse will flow through a line 162 to coil 108a to give the extra impulse needed. On the 3rd, 13th and 23rd of the month, switch 157 will close, but bus bar 159 will not be energized, switch 129 being then open. At the end of 30 day or 28 day months no impulse will be created since switch 120 will be open and switch 129 will not be energized.

Each time the motor 95 operates to make an end of the month change on date switch banks 2 and 3, it is necessary to rotate cam shaft 119 one twelfth of one revolution to create a month change on date switch bank 1. This rotation is accomplished by means of a motor 163 coupled to shaft 119. The motor 163 is connected by a line 164 to the switch 165b of a ratchet type relay 165. The relay 165 operates in the same manner as relay 108. It includes a coil 165a which, when energized, operates a ratchet mechanism to move switch 165b from one position to another. Switch 165b is adapted to move between contact points 166 and 167 and each energization of coil 165a moves the switch 165b from one of these contact points to the other.

Contact point 166 is connected by a line 168 to a cam operated switch 169 mounted at the end of date switch bank 1. Contact point 167 is connected by a line 170 to another cam operated switch 171. Both switches 169 and 171 are adapted to close against bus bar 126 and receive power therethrough from source 128. Each of switches 169 and 171 is controlled by a cam 172 fixed on shaft 119. The two cams 172 are identical, so only one is shown in FIGURE 9. As illustrated, each cam 172 has six equally spaced lobes 172a thereon. The cams 172 are fixed on shaft 119 so that the lobes of one are staggered with respect to the other, as is the case with cams 116. Thus, at any of the twelve positions of shaft 119, one of the switches 169 and 171 will be open and the other will be closed. Each switch 169 and 171 closes on alternate months. The switch 169 for example, is closed during January, March, May, July, etc. and the switch 171 is closed during February, April, June, etc. That switch which is closed will carry current to the contact point 166 or 167 connected therewith. When relay switch 165b closes against the energized contact, current will flow to motor 163 causing cam shaft 119 to be rotated. The motor 163 will operate until cam shaft 119 has rotated one twelfth of one revolution, causing the closed switch 169 or 171 through which motor current is flowing, to be opened. This one twelfth revolution is sufficient to make the required month change on switch bank 1.

The month change is initiated by manipulation of a cam switch 173 located at the end of date switch bank 2. Switch 173 is adapted to close against bus bar 156 and receive power from source 128. It is controlled by a cam 174 (see FIGURE 9) mounted on shaft 98. Cam 174 is shaped to hold switch 173 open at all times save when cam shaft 98 is rotating from a position where it causes bank 2 to display the number three to a position where it causes bank 2 to display a blank. This occurs only during an end of the month change. A depression 174a in the operating surface of cam 174 permits switch 173 to close momentarily at this time, and receive an impulse of power from bus bar 156. The impulse of power thus received is transmitted from switch 173 to the coil 165a of relay 165 through a line 175. This impulse will cause switch 165b to be moved from one contact 166 or 167 to the other, and close the circuit to motor 163.

To illustrate, consider that the date is January 31st. During January, switch 169 is closed and contact 166 is energized. Relay switch 165b, however, is closed against contact 167 connected to open switch 171 and no current is flowing to motor 163. At midnight on the 31st an end-of-the-month change will be initiated through switches 120, 129 and 135 as hereinbefore described and motor 95 will operate to rotate cam shafts 96 and 98 through positions representing numbers from thirty-two to thirty-nine, stopping these shafts in position to display a blank and a one. As the shaft 98 moves toward the blank position, switch 173 will be momentarily closed, impulsing coil 165a. This impulse will close switch 165b against contact 166 and establish a circuit through cam switch 169 to motor 163. Motor 163 will drive cam shaft 119 to the February position and then open switch 169 to break the motor driving circuit. At the same time, switch 171 will close to energize contact 167 and prepare the mechanism for another month change when coil 165a is next energized on February 28th at midnight.

The double pole, double throw switch 145 is a "leap year" switch. During normal years it is closed as shown in FIGURE 8 to connect line 144 to line 144a and to connect line 160 to line 161. Line 144, it will be remembered, normally connects the 28 day switch 121 on bank 1 to switches 131 and 137 to create an end of the month change on midnight of February 28th. The line 160 normally connects bus bar 159 to switch 129 to provide for the extra impulse to coil 108a at the end of 31-day months. During leap years, however, it is necessary to initiate an end of the month change at midnight of February 29th instead of February 28th. It is also necessary to provide an extra impulse to coil 108a at the end of this month since it ends on an odd day. Switch 145 provides for these changes when reversed from its normal position.

When switch 145 is reversed, line 144 is connected to a line 176 that is in turn connected to the bus bar 177 of a cam switch 178 at the end of date switch bank 2. Cam switch 178 is intended to be closed at the time switch bank 2 is displaying the number three and is controlled by a cam 179 on shaft 98. Cam 179 has a single depression 179a on its operating face positioned to close when shaft 98 is rotated to cause date switch bank 2 to display a three. Switch 178 is connected by a line 180 to a cam switch 181 located at the end of date switch bank 3. Switch 181 closes against bus bar 141 and is intended to be closed only when date switch bank 3 is displaying a zero. It is controlled by a cam 182 (see FIGURE 9) on a shaft 96. Cam 182 has a depression 182a positioned to close switch 181 when shaft 96 is rotated to a position to display the number zero. It will be seen that with these circuit elements and connections, a circuit path will be established from source 128 through switch 122, switch 178 and switch 181 to energize bus bar 141 only at midnight of February 29th as the shafts 96 and 98 are rotating to set banks 2 and 3 to display the number thirty, provided the leap year switch 145 is in the leap year position. Energization of bus bar 141 initiates an end of the month change as previously described.

When switch 145 is in the leap year position, line 160 is connected to a line 183 that is connected to switch 178. These connections will cause bus bar 159 to be energized during the leap year February end of the month change, so that an extra impulse will be sent to coil 108a as needed. With this construction the dates of a leap year will be properly recorded, provided that the switch 145 is turned to leap year position sometime during February and returned to normal position some time during March.

It is believed that the nature and advantages of our invention will be apparent from the foregoing description, read in connection with the accompanying drawings.

Having thus described our invention, we claim:

1. In a display sign, a display panel having a plurality of lamps thereon connected in a plurality of separate circuits, a power source, a group of switches connected to said power source and to said lamp circuits and operable to selectively light the lamps, means connected with the switches of said group for manipulating said switches to maintain combinations of open and closed switches representing days of the month and months of the year, a clock mechanism, means connected with said clock mechanism for actuating said switch manipulating means at twenty-four hour intervals to cause said switches to be manipulated to indicate current days of the month, and control means connected with said switches operable to actuate said switch manipulating means at the end of the last day of each month to cause said switches to be manipulated to indicate a new month and to cause said switches to be manipulated to indicate the first day of the new month.

2. In a display sign, a display panel having a plurality of separate circuits, a power source, a group of switches operable to control the lighting of said lamps from said power source, switch manipulating means operatively connected with said group of switches, first control means operable to actuate said manipulating means at twenty-four hour intervals and to cause said manipulating means to manipulate certain of said switches to maintain combinations of open and closed switches proper for causing certain of said lamps to be lighted to display the current day of the month and second control means operable to actuate said manipulating means at the end of the last day of each month to manipulate certain of said switches to maintain combinations of open and closed switches proper for causing certain of the lamps to be lighted to display the present month.

3. In a display sign, a display panel having a plurality of lamps thereon connected in a plurality of separate circuits, a power source, a group of switches operable to control the lighting of said lamps from said power source, first manipulating means connected with certain of the switches of said group operable to manipulate said switches to set up combinations of open and closed switches proper for causing certain of the lamps on the panel to be lighted to display numbers from one to thirty-nine, second manipulating means connected with certain switches of said group operable to manipulate said switches to set up combinations of open and closed switches proper for causing certain lamps on the panel to be lighted to display letters representing the several months of the year, a clock mechanism, first control means connected to said clock mechanism and to said first manipulating means operable to actuate said first manipulating means at twenty-four hour intervals to manipulate the switches connected thereto to change the number displayed to the next succeeding number, second control means connected to said second manipulating means operable at the end of the last day of each month to actuate said second manipulating means to manipulate the switches connected thereto to change the month displayed to the next succeeding month, and means interconnecting said first and second control means operable at the end of the last day of each month to cause said first named control means to actuate the first named manipulating means to manipulate the switches connected therewith to change the combination of open and closed switches to a combination proper for causing the lamps on the panel to be lighted to display the number one.

4. In a display sign, a display panel having a plurality of lamps thereon connected in a plurality of separate circuits, a power source, a first bank of switches connected to said power source and to certain of the lamp circuits, first cam shaft means adjacent said first switch bank having cam means thereon operable to selectively open and close the switches of said first bank of switches to set up combinations of open and closed switches proper for lighting lamps on the panel to display letters representing the twelve months of the year upon rotation of said first cam shaft means, a second bank of switches connected to said power source and to certain of the lamp circuits, second cam shaft means adjacent said second bank having cam means thereon operable to selectively open and close the switches of said second bank of switches to set up combinations of open and closed switches proper for lighting lamps on said panel to display numbers from one to thirty-nine upon rotation of said second cam shaft means, a first motor drivingly connected to said first cam shaft means, a second motor drivingly connected to said second cam shaft means, a clock mechanism, first control means connected to said clock mechanism and to said second motor operable at twenty-four hour intervals to drive said second motor a predetermined amount whereby to cause said second cam shaft and cam means to manipulate the switches of said second bank of switches to advance the number displayed on said panel to the next consecutive number, second control means connected to said first and second cam shaft means operable in response to month and date changes to indicate the end of the last day of each month and operable at the end of the last day of each month to drive said first motor a predetermined amount to cause the first cam shaft and cam means to manipulate the switches of the first bank of switches to advance the month displayed to the next consecutive month and to drive the second named motor a sufficient distance to cause said second cam shaft and cam means to manipulate the switches of the second bank of switches to set up a combination proper for displaying the number one.

5. The device as defined in claim 4 wherein said first control means comprises first and second switches operated respectively by first and second cams operatively connected to said clock mechanism and adapted to be momentarily closed at predetermined hours of the day, said second switch being operable during the indexing of the clock mechanism to the hour one, a first ratchet solenoid, said first switch being wired in series in the power circuit to the coil of the first ratchet solenoid, a second ratchet solenoid, said second switch being wired in series with the contacts of said first ratchet solenoid in the power circuit to the coil of the second ratchet solenoid, said second ratchet solenoid including a movable contact element and first and second fixed contact elements adapted to be alternately engaged by the movable contact element, the movable element being wired to said power source, first and second switches operated alternately by a pair of cams mounted on said second cam shaft, said last named switches being wired in parallel to said second motor and being respectively wired to said first and second fixed contact elements in said second ratchet solenoid.

References Cited in the file of this patent

UNITED STATES PATENTS

| | | |
|---|---|---|
| 2,263,281 | Von Tadden | Nov. 18, 1941 |
| 2,673,976 | Williams | Mar. 30, 1954 |

FOREIGN PATENTS

| | | |
|---|---|---|
| 466,861 | Great Britain | June 7, 1937 |